T. P. SMART.
HEATING SYSTEM.
APPLICATION FILED MAY 29, 1912.
1,050,397.
Patented Jan. 14, 1913.
3 SHEETS—SHEET 2.
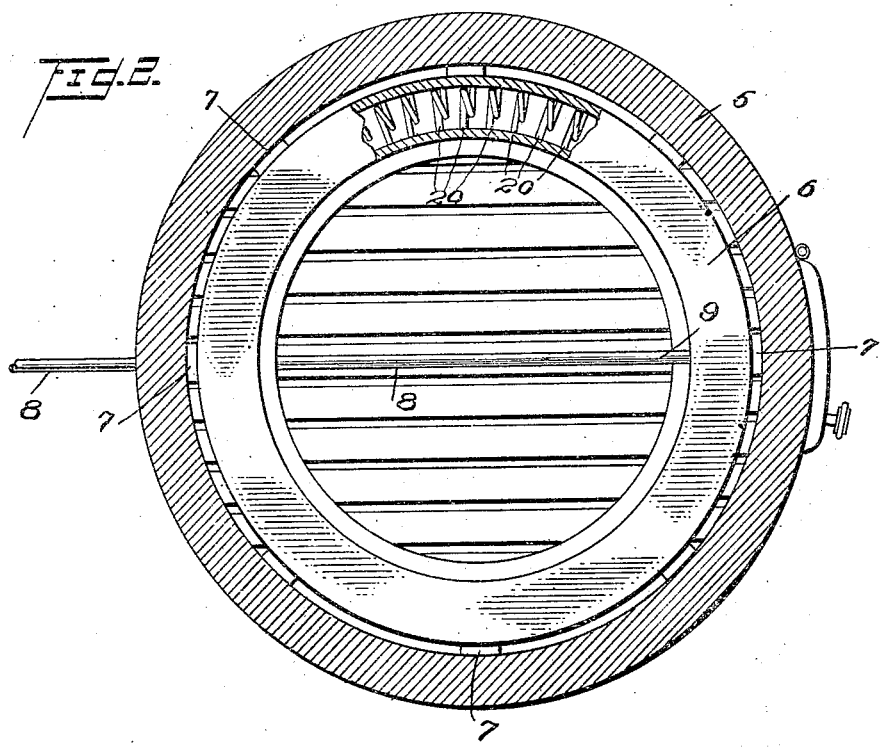
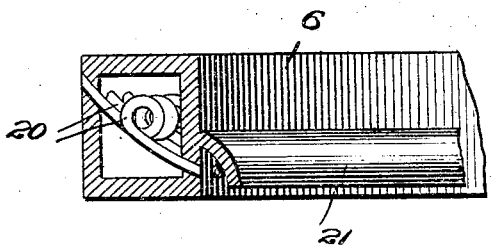
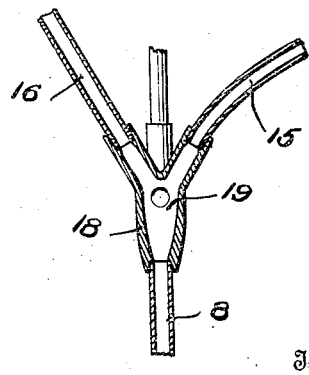
Witnesses
H. Strauss
R. H. Krenkel
Inventor
Turence P. Smart
By Joshua R. H. Potts
Attorney

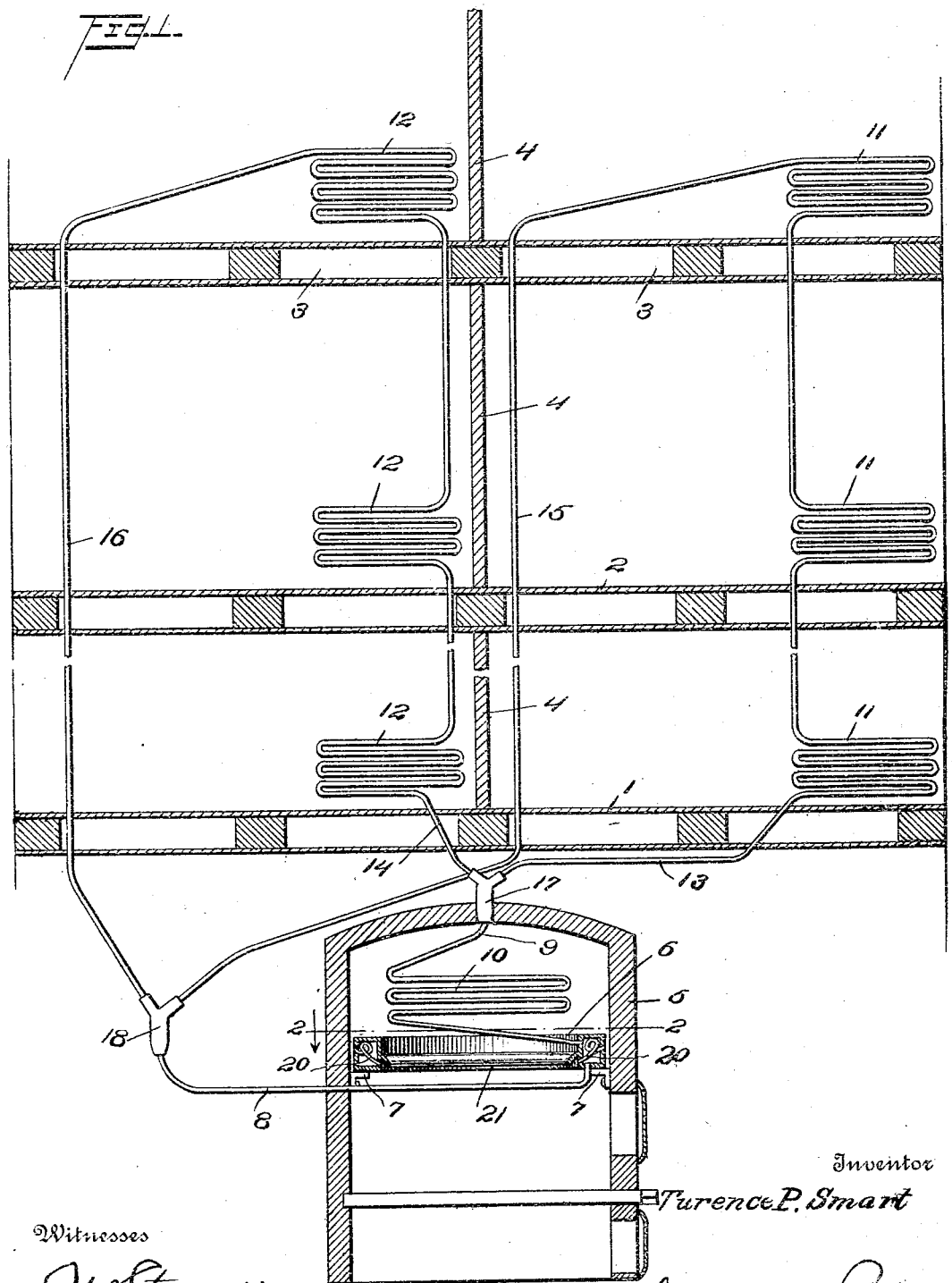

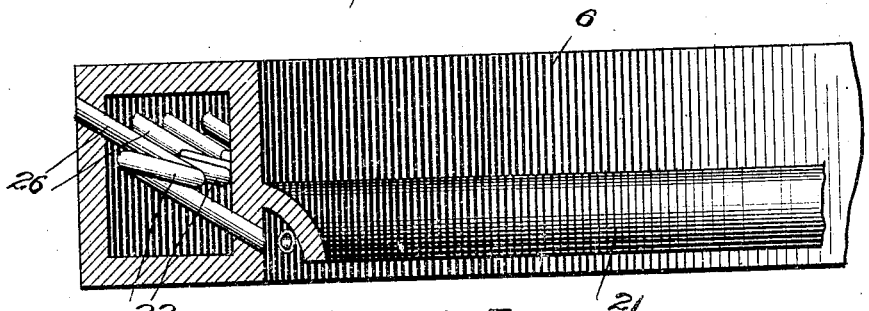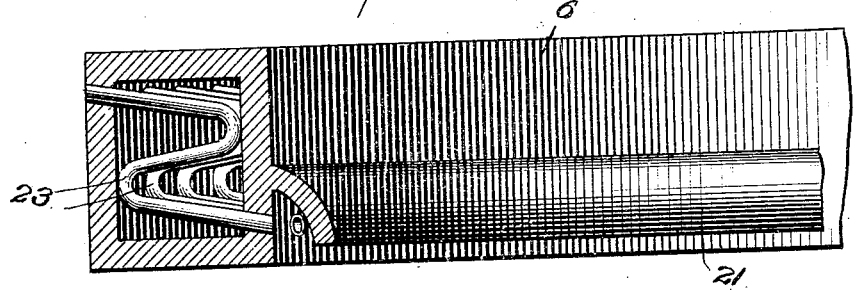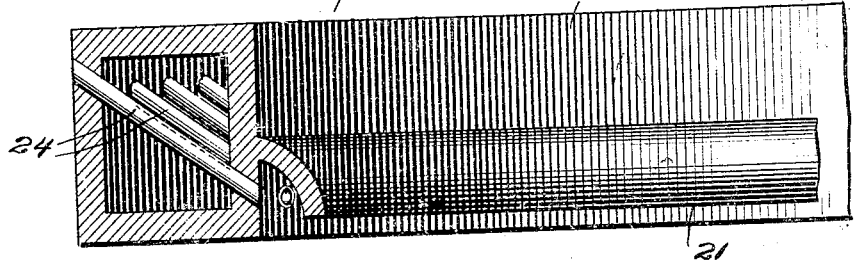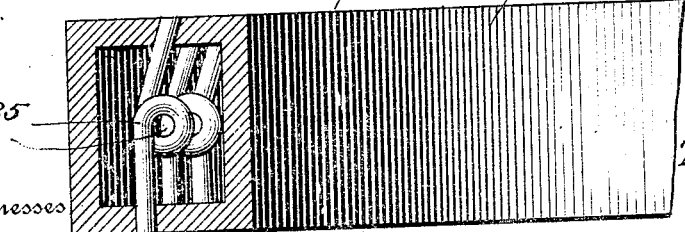

# UNITED STATES PATENT OFFICE.

TURENCE P. SMART, OF PHILADELPHIA, PENNSYLVANIA, ASSIGNOR OF ONE-THIRD TO ADOLPH SCHWARTZ, OF PHILADELPHIA, PENNSYLVANIA.

HEATING SYSTEM.

1,050,397.  Specification of Letters Patent.  Patented Jan. 14, 1913.

Application filed May 29, 1912. Serial No. 700,492.

*To all whom it may concern:*

Be it known that I, TURENCE P. SMART, a citizen of the United States, residing at Philadelphia, in the county of Philadelphia and State of Pennsylvania, have invented certain new and useful Improvements in Heating Systems, of which the following is a specification.

My invention relates to improvements in heating systems, more particularly to hot water heating systems, the object of the invention being to provide an improved construction of water chamber and heating coils within a fire box of any sort which will utilize to the maximum degree the heat units of the fuel, causing the water to be highly heated and insure a rapid circulation through the system.

A further object is to provide an improved system comprising radiators consisting of coils, and so connect the coils in a continuous circuit or circuits with pipe couplings having reducing chambers therein, so that a plurality of pipes may join with a single pipe and the volume of water of the plurality of pipes be carried off through the single pipe at an increased speed.

A further object is to provide a heating system in which right angle bends are dispensed with, so that the water has a free flow throughout the system.

With these and other objects in view, the invention consists in certain novel features of construction and combinations and arrangements of parts, as will be more fully hereinafter described and pointed out in the claims.

In the accompanying drawings: Figure 1, is a diagrammatic view illustrating my improved system. Fig. 2, is an enlarged view in section on the line 2—2 of Fig. 1. Fig. 3, is an enlarged view in section through the water chamber shown in Figs. 1, and 2. Fig. 4, is an enlarged view in longitudinal section of one of the pipe couplings, and Figs. 5, 6, 7, and 8, are views similar to Fig. 3 illustrating modified forms of water back.

Referring particularly to the diagrammatic view (Fig. 1), 1, 2, and 3, represent the floors of a building and 4 a vertical wall or partition dividing the floors into rooms.

5, represents a furnace which may be of any construction or any sort of heating apparatus located in either the cellar or any other part of the building, and when I use the term "furnace", it is to be understood it is used broadly to apply to any form of heater.

6, represents my improved water chamber which is preferably in the form of a hollow ring located in the furnace in the upper portion of the fire box, and supported on brackets 7 with its outer face spaced from the inner wall of the furnace, so that the smoke and gases may pass entirely around the water chamber.

8, is a return pipe which connects to the bottom of the water chamber and 9 is an outlet pipe which connects with the coil 10 in the upper part of the fire box, and said coil communicates with the upper portion of the water chamber.

11, 11, 11, represent one series of radiators, and 12, 12, 12, a second series of radiators. The radiators in each series constitute coils which are parts of single supply pipes 13 and 14 respectively and single return pipes 15 and 16 respectively. The supply pipes 13 and 14 are connected to pipe 9 by means of my improved coupling 17, and a similar coupling 18 connects the return pipes 15 and 16 with the return pipe 8. One of these couplings is illustrated in section in Fig. 4, and it will be noted that the coupling is in the form of a Y having an internal chamber 19 greatest in diameter at its point of juncture with the branches connected to the pipes 15 and 16, and smallest where it connects to the pipe 8 at which point it is of the same internal diameter as the pipe 8. Coupling 17 is precisely like coupling 18, and the operation is the same except that the water flows through the couplings in opposite directions. The hot water as it rises from the coil 10, divides in the chamber 19 and flows through the pipes 13 and 14, up through the radiators 11 and 12 of the respective series, and then returns through the pipes 15 and 16 to the coupling 18, where the double volume of water passes into the single pipe 8, and increases the speed or velocity of the water as it passes through this pipe, through the water chamber and through the coil 10 back to coupling 17.

The water chamber 6 as above explained constitutes a hollow ring, and to utilize the maximum of heat units, this water chamber is provided with a circular series of flues 20 which constitute pipes positioned at an incline and coiled between their ends as shown. The inner entrance ends of said flues are protected by an annular curved lip 21 on the water chamber, and the outlet ends direct the smoke and gases into the space between the water chamber and the wall of the furnace. Therefore the water in the water chamber receives the direct heat of the smoke and gases passing through the flues 20, as well as in direct contact with the outer face of the water chamber.

Fig. 5 shows a modification in which the flues 26 have their coils 22 disposed horizontally.

Fig. 6 shows a modified form of coil 23 which has a general compound curvature.

Fig. 7 shows a modified form of water chamber having inclined flues 24, and Fig. 8 shows a modified form of water chamber having somewhat vertically disposed flues coiled between their ends. In this latter form of water chamber, no lip 21 is necessary, as the ashes cannot accumulate to close the flues, nor can clinkers or pieces of coal get into the flues as is the case with the other forms above described.

While I have described my improvements in connection with a heating apparatus in the cellar, it is to be understood that I do not limit myself to any such use, but may employ the water chamber in an ordinary coal range, and shape the water chamber in various ways to accommodate itself to the stove in which it is used, and I believe that such an attachment will gradually reduce the cost of heating in large buildings or small houses, particularly with reference to the latter in which the present expensive hot water systems cannot be employed.

Various changes other than those set forth might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a water heater, the combination with a fire box, of a water chamber in the fire box, and a series of flues projecting through the water chamber and communicating at their ends with the interior of the fire box, substantially as described.

2. In a water heater, the combination with a fire box, of a water chamber in the fire box, and a series of flues projecting through the water chamber and communicating at their ends with the interior of the fire box, said flues coiled between their ends, substantially as described.

3. In a water heater, the combination with a fire box, of a water chamber in the fire box, and a series of flues projecting through the water chamber and communicating at their ends with the interior of the fire box, said flues coiled between their ends, and a pipe coil above said water chamber and interposed in the line of passage through said pipes, said water chamber comprising a circular hollow ring, substantially as described.

4. In a water heater of the character described, the combination with a fire box, of an annular hollow ring in said fire box of smaller diameter than the fire box, said ring constituting a water chamber, a series of flues projecting through the water chamber and communicating at both ends with the fire box, said pipes coiled between their ends, and an internal annular lip on said ring overhanging the entrances to said pipes, substantially as described.

In testimony whereof I have signed my name to this specification in the presence of two subscribing witnesses.

TURENCE P. SMART.

Witnesses:
THOMAS F. DEEGAN,
R. H. KRENKEL.